3,265,714
PRODUCTION OF DIHALOCARBENE ADDUCTS
Gene C. Robinson, Baton Rouge, La., assignor to Ethyl Corporation, New York, N.Y., a corporation of Virginia
No Drawing. Filed June 28, 1962, Ser. No. 205,850
8 Claims. (Cl. 260—345.2)

The present invention pertains to a novel process involving the generation of dihalocarbene and the proximate formation of dihalocarbene adducts.

The prior art discloses several methods for the generation of dihalocarbene and the formation of dihalocarbene adducts, for example, the reaction of metallic potassium and tertiary butyl alcohol followed by the reaction with chloroform in the presence of cyclohexene. Although the reported yield of dichloronorcarane is quite good—59 percent—this procedure requires the use of expensive reagents. Another method comprises reacting potassium hydroxide and chloroform in an aqeuous medium and in the presence of cyclohexene. The reported yield of dichloronorcarane was 0.55 percent. For further discussion see "The Addition of Dichlorocarbene to Olefins," by Doering and Hoffman, Journal of the American Chemical Society, vol. 76, 1954, page 6162 et seq.

An examination of the prior art will disclose that the previously known processes are generally characterized by low yields or the use of expensive reagents. Accordingly, it is an object of this invention to provide the art with a novel process involving the generation of dichalocarbene which is attractive both from the standpoint of yields obtained and process economics.

This object is accomplished by reacting together a mixture comprising an alkali metal hydroxide, a haloform, and a dihalocarbene acceptor in an ether solution. The aforesaid reagents and solvent, as initially charged into the reaction zone are to be essentially anhydrous. In other words, an aqueous solvent is not employed in the present process, and more importantly, the reaction system is essentially anhydrous at the outset. This latter feature appears to enable the reaction to commence. Once the reaction has started, the halocarbene produced appears to react so quickly with the halocarbene acceptor which is co-present that it is unnecessary to remove the by-product water from the reaction scene.

The yields of the desired adducts produced pursuant to this invention have reached as high as 85 percent. It definitely appears that the ether solvent is at least partly responsible for these very beneficial results. Furthermore, these good yields are achieved utilizing cheap and readily available reactants. It is interesting to compare these results with the 0.55 percent yield reported by Doering and Hoffman who attempted to make use of potassium hydroxide as a basic reagent.

When carrying out the process of this invention it is necessary to employ intially essentially anhydrous reagents and solvent. A distinctly preferred embodiment of this invention is to employ a means to minimize the effect of water which may initially be present as a trace impurity in the reagents and also the water which is generated by the reaction itself. A wide variety of methods may be employed to effect this result. An excellent method is to add an excess of the alkali metal hydroxide to the reaction system in order to reduce the effective water concentration. Of course, when desired, other desiccants which are inert to the reaction mass may be added thereto, e.g., silica gel, asbestos, charcoal, and the like.

Another desirable method is reflux drying which is accomplished either by gravimetric entrapment of the water in the reflux return or by bringing the reflux vapors into contact with a desiccant or both. Materials which may be used to dry the reflux are phosphorus pentoxide, magnesium percholorate, alkali and alkaline earth metal hydroxides, aluminum oxide, sulfuric acid, magnesium oxide, beryllium perchlorate, calcium oxide, calcium bromide, calcium chloride, zinc chloride, zinc bromide, copper sulfate, silica gel, charcoal, asbestos, and the like. Excellent results are achieved when both reflux drying and an in situ desiccant is employed. A preferred embodiment of this invention both from the standpoint of simplicity and economics comprises the use of an excess of the metal hydroxide reagent as the in situ dessicant.

The alkali metal hydroxides to be emplo ed in this process are lithium hydroxide, sodium hydro: ide, potassium hydroxide, rubidium hydroxide and cesium hydroxide. These alkali metal hydroxides may be employed individually or in admixture. The preferable hydroxides for this reaction are sodium hydroxide and potassium hydroxide. With regard both to reactivity and cost effectiveness the use of sodium hydroxide is a particularly preferred embodiment of this invention.

The metal hydroxide reagent may be employed in stoichiometric quantities, i.e., a molar ratio of hydroxide to haloform of 1:1, however it is preferred that an excess be used due both to the desirability of decreasing the effective concentration of water generated by the reaction and to insure the efficient consumption of the haloform. An effective molar ratio of the hydroxide to the haloform has been found to be within the range of from about 1.5:1 to about 5:1. A particularly effective molar ratio has been found to be from about 2:1 to about 4:1.

It is preferred, though not required, that the metal hydroxide be employed in finely divided form (i.e., the average particle size should range from about 50 to about 500 microns). This can be accomplished in situ by high speed stirring or the hydroxide as initially charged can be finely divided.

The haloforms which are to be used in this reaction are those having at least 1 atom of chlorine or bromine. Examples of these haloforms are chloroform, bromoform, dichlorobromoform, dibromochloroform, difluorochloroform, dibromochloroform, dichlorofluoroform, dibromofluoroform, diiodochloroform, dichloroiodoform, diiodobromoform, chlorobromoiodoform, fluorochloroiodoform, fluorobromoidoform, and the like. The various haloforms mentioned above may be used individually or in admixture in this process, however, particularly from the commercial standpoint, chloroform and bromoform are preferred. The use of chloroform in all respects is very advantageous.

As was started above, an ether solvent is to be the reaction medium for the process of this invention. A wide variety of ethers can be used to advantage, for instance, diethyl ether, bibutyl ether, methyl ethyl ether, methyl n-propyl ether, ethyl isopropyl ether, tert-butyl methyl ether, ethyl n-propyl ether, diphenyl ether, phenyl ethyl ether, tetrahydrofuran and ring alkylated derivatives thereof, 1,4-dioxane, dioxolane, tetrahydropyran and the like. Preferred solvents are the ethers of saturated alipahtic polyhydroxy alcohols having from about 4 to about 50 carbon atoms. These are generally referred to in the art as saturated aliphatic polyethers. Distinctly preferred ethers are ethers of the last mentioned group having a ratio of carbon atoms to oxygen atoms which ranges up to about 3:1. Examples of these are ethylene glycol dimethyl ether, diethylene glycol dimethyl ether, triethylene glycol dimethyl ether, tetraethylene glycol dimethyl ether, isopropylene glycol dimethyl ether, ethylene glycol ethyl methyl ether, ethylene glycol diethyl ether, ethylene glycol methyl propyl ether, and the like. Very excellent solvents with respect to yields obtained and reaction rate are diethylene glycol dimethyl ether and triethylene glycol dimethyl ether and hence their use is a preferred embodiment of this invention. Triethylene glycol dimethyl ether is itself particularly preferred.

Ethers containing multiple bonds (i.e., unsaturated ethers) are also excellent solvents, however due to the fact that, generally, the multiple bond serves as a dihalocarbene acceptor these ethers would be used only when they are also the desired acceptor. Examples of these ethers are dihydropyran, vinyl ethyl ether, 2,5-dihydrofuran, diallyl ether, glycerol triallyl ether, glycerol trivinyl ether and the like.

The use of the above described ether solvents and particularly the preferred solvents is a unique feature of this invention in that it has proven to dramatically increase yields and reaction rates. In other words, the ether serves as a catalyst as well as a solvent. In demonstration of this, when this process is carried out without an ether solvent the yields range up to 45 percent and the reaction period is in the range of 10 to 14 hours whereas when an ether solvent is employed yields range up to 85 percent and usual reaction periods are in the neighborhood of 1.5 hours.

The quantity of ether solvent employed in relation to the quantity of hydroxide is significant and if best results are to be achieved it is recommended that the molar ratio of ether to hydroxide in the reaction system should be above about 0.1:1. A preferred molar ratio of ether to hydroxide has been found to be within the range of from about 0.5:1 to about 10:1. A particularly effective range is from about 1:1 to about 5:1.

The ether may be employed in this process either in pure form or it may be cut with other solvents which are inert to the reaction system. Examples of suitable solvents are hexane, heptane, cyclohexane, petroleum ether, petroleum spirit, kerosene, and the like. The exact concentration of ether in this solvent mixture is not too important as long as the molar ratio of ether to hydroxide remains within the ranges stated above. However it is recommended that extreme dilution of the ether should be avoided and best results are achieved when the concentration of ether is above about 20 percent by volume of the mixture.

Due to the highly reactive nature of dihalocarbene it is desirable to react it proximately as formed with a material with which it is capable of forming an adduct. This is preferably accomplished in situ, i.e., charging the reactor initially with a dihalocarbene acceptor. The dihalocarbene acceptors cover a very wide range of chemical compounds and generally will comprise organic compounds having up to 25 carbon atoms containing the aliphatic double bond, the aromatic double bond in a condensed ring nucleus, the carbon to carbon triple bond, the carbon to nitrogen double bond, the carbon to nitrogen triple bond, and also organohalometallic compounds, and polymers having a multiple bond as part of the repeating unit. The following are exemplary of compounds capable of forming an adduct with dihalocarbene.

Ethylene, propylene, butene-1, cis-butene-2, trans-butene-2, isobutylene, diisobutylene, propylene trimer, propylene tetramer, cyclohexene, cyclooctene, cyclopentene, cyclooctadiene-1,5, cyclooctadiene-1,3, bicycloheptene, bicycloheptadiene, anethol, butadiene, isoprene, chloroprene, camphene, styrene, divinylbenzene, alpha-methylstyrene, propylbenzene, allylbenzene, biallyl, dicyclopentadiene, cyclopentadiene, methylcyclopentadiene, methylcyclopentadiene dimer, dihydropyran, dipentene, vinyl chloride, triisobutylene, vinyl butyl ether, vinyl ethyl ether, vinylidene chloride, alpha-pinene, beta-pinene, tetramethylethylene, 2,5-dihydrofuran, diallylether, 4-methylpentene-1, pentene-1, pentene-2, 2-methylbutene-1, 2-methylbutene-2, 3-methylpentene-1, 3-methylpentene-2, hexene-1, hexene-2, octene-1, octene-2, octene-3, decene-1, dodecene-1, tetradecene-1, octadecene-1, hexadecene-1, cholestene, 4-vinylcyclohexene-1, acrolein diethyl acetal, 2-ethylhexene-1, indene, stilbene, dimethyl ketene, acetal, diethyl ketene acetal, vinylacetylene, 1-ethyl-1-butylethylene, glycerol triallyl ether, glycerol trivinyl ether, 1,5,9-cyclododecatriene, cyclooctatetraene.

Anthracene, 1-methoxynaphthalene, 2-methoxynaphthalene, 9-methoxyphenanthrene, phenanthrene, acenaphthylene.

Methyl amine, ethyl amine, propyl amine, allyl amine, ethanolamine, aniline, p-toluidine, m-toluidine, o-toluidine, alpha-naphthyl amine, beta-naphthyl amine, p-anisidine, cyclohexylamine.

Benzalaniline, benzalazine, diethylcarbodiimide.

Acetylene, methylacetylene, hexyne-3, butyne-1, butyne-2, phenylacetylene, cyclodecyne, diphenylacetylene.

Oleic acid, undecylenic acid, crotonic acid, cinnamic acid, methyl vinyl ketone, mesityl oxide, acrylic acid, methacrylic acid, acrylonitrile, benzalacetone, dibenzalacetone.

Allyl alcohol, crotyl alcohol, methyl vinyl carbinol, cinnamyl alcohol, 3-butene-1-ol.

Phenyltrichloromethylmercury, phenyltribromoethylmercury, methyltrichloromethylmercury, trimethyltrichloromethyltin, triphenyltrichloromethyltin, triethyltrichloromethyllead, diethyl trichloromethylthallium (III), trichloromethylthallium (I).

The nature and identity of a wide variety of dihalocarbene acceptors are known in the art. For instance, reference may be had to Journal of the American Chemical Society, vol. 76, page 6162 (1954), vol. 81, page 2579 (1959), vol. 83, page 603 (1961), vol. 82, page 4085 (1960).

Equimolar amounts of the dihalocarbene acceptor and the haloform may be employed, however it is usually desirable to employ an excess of the acceptor. Generally, good results will be obtained when the molar ratio of acceptor to dihalocarbene is within the range of from about 1.5:1 to about 10:1. An excellent operating molar ratio is within the range of from 2:1 to about 5:1.

This process may be conducted at atmospheric pressure in an open vessel or at autogenous pressure in a closed vessel. When the dihalocarbene acceptor is a gas under the reaction conditions pressure will generally be required. The exact temperature for this process depends, of course, on the particular reagents used, generally however good results will be obtained when the temperature is within the range of from 0° C. to about 250° C. A recommended operating temperature range is from about 20° C. to about 110° C. The reaction will be complete in from about 30 minutes to about 4 hours depending on the process conditions. Usually a reaction time of from about 30 minutes to about 1.5 hours is sufficient.

The following examples illustrate the process of this invention.

*Example 1*

Into a dry 300 milliliter three-necked flask fitted with a stopper, a stirrer, and a device which dried the reflux with calcium chloride were charged 1.1 moles of dihydropyran, 0.5 mole of chloroform and 0.5 mole of sodium hydroxide in commercially available pellet form. The reagents were initially anhydrous. The excess of dihydropyran served as the ether solvent. The mixture was heated at about 90° C. with slow stirring for 4.5 hours. The sodium hydroxide remained in substantially pellet form until consumed and the reaction mass became increasingly aqueous as the reaction proceeded. The yield of 4-oxa-7,7-dichloronorcarane was 60 percent.

Example II

Into a dry 300 milliliter three-necked flask equipped with a stirrer, were charged 0.5 mole of sodium hydroxide, 0.25 mole of chloroform, 0.5 mole of cyclohexene and 100 milliliters of diethylene glycol dimethyl ether. The reactants and solvent were anhydrous initially and sufficient excess sodium hydroxide was charged to minimize the effect of the water generated. The mixture was heated at 90° C. for about 1 and one-half hours with slow stirring. The sodium hydroxide remained in pellet form. An 82 percent yield of dichloronorcarane was obtained.

Example III

Into a dry 200 milliliter three-necked flask fitted with a stirrer, were charged 0.25 mole of tetramethylethylene, 1.0 mole of sodium hydroxide in commercially available pellet form, 0.25 mole of chloroform, and 21 moles of diethylene glycol dimethyl ether. The reactants and solvent were anhydrous initially and sufficient excess of sodium hydroxide was charged to minimize the effect of the water generated by the reaction. The reaction proceeded at 90° C. for 40 minutes with slow stirring. The sodium hydroxide remained in substantially pellet form. The yield of 1,1-dichloro-2,2,3,3-tetramethyl cyclopropane was 70 percent.

Example IV

Into a dry 100 milliliter three-necked flask fitted with a stirrer and a water trap were charged 0.14 mole of 2,5-dihydropyran, 0.5 mole of sodium hydroxide in commercially available pellet form, 0.25 mole of chloroform, and 20 milliliters of diethylene glycol dimethyl ether. The reagents were initially anhydrous. Sufficient excess sodium hydroxide was charged to minimize the effect of the water generated by the reaction. The reaction proceeded at approximately 100° C. for 40 minutes accompanied by slow stirring. The sodium hydroxide remained in pellet form. The yield of 7,7-dichloro-4-oxabicyclo [4,1,0] heptane was 50 percent.

Example V

Into a dry 200 milliliter reaction vessel equipped with a high speed stirrer were charged 0.25 mole of cyclohexene, 0.25 mole of chloroform, 1.0 mole of sodium hydroxide in commercially available pellet form and 25 milliliters of triethylene glycol dimethyl ether. The reagents and solvent were initially anhydrous, and the effect of the water generated was minimized by the excess sodium hydroxide. The reaction was conducted at 30° C. for 4 hours. The high speed stirring served to pulverize the sodium hydroxide pellets. The yield of dichloronorcarane was 79 percent.

Example VI

Into a dry 200 milliliter reaction vessel equipped with a high speed stirrer were charged 0.25 mole of cyclohexene, 0.25 mole of chloroform, and 1.0 mole of sodium hydroxide in commercially available pellet form and 25 milliliters of diethyl ether. The reagents and solvent were initially anhydrous, and the effect of the water generated was minimized by the excess sodium hydroxide. The reaction was conducted at 30° C. for about 4 hours. The high speed stirring served to pulverize the sodium hydroxide pellets. The yield of dichloronorcarane was 40 percent.

Example VII

Into a dry 200 milliliter reaction vessel equipped with a high speed stirrer were charged 0.25 mole of cyclohexene, 0.25 mole of chloroform, 1.0 mole of sodium hydroxide in commercially available pellet form and 25 milliliters of tetrahydrofuran. The reagents and solvent were initially anhydrous, and the effect of the water generated was minimized by the excess sodium hydroxide. The reaction was conducted at 30° C. for 4 hours. The high speed stirring served to pulverize the sodium hydroxide pellets. The yield of dichloronorcarane was 50 percent.

The art suggests many uses for adducts of dihalocarbene, for instance, the Journal of the American Chemical Society, vol. 81, page 2579 (1959) discloses that the adducts formed from ketene acetals are readily pyrolyzed to alpha-chloroacrylic esters. Also the Journal of the American Chemical Society, vol. 83, page 603 (1961) discloses the formation of chlorotropones by the elimination of methyl chloride from the dichlorocarbene adduct of methoxy naphthalene. The Journal of the American Chemical Society, vol. 82, page 4085 (1960) discloses a synthesis of 2,3-dihydro-6-chlorooxypine and 2,3-dihydrooxypine which involves the reaction of dichlorocarbene with hydropyran followed by pyrolysis of the cyclopropane adduct.

What I claim as new and desire to secure by Letters Patent of the United States is as follows:

1. A process involving the generation of dihalocarbene and the proximate formation of dihalocarbene adducts which comprises the step of reacting together in an ether an initially essentially anhydrous mixture of an alkali metal hydroxide, a haloform and a dihalocarbene acceptor; said ether having a ratio of carbon atoms to oxygen atoms of up to about 3:1 and being selected from the group consisting of (1) $R_1$—O—$R_2$ where $R_1$ and $R_2$ are lower alkyl or phenyl, (2) tetrahydrofuran and ring alkylated derivatives thereof, (3) dioxane, (4) dioxolane, (5) tetrahydropyran, (6) dilower alkyl ethers of ethylene glycol, and (7) dilower alkyl ethers of polyethylene glycol, said haloform containing at least one halogen atom selected from the group consisting of chlorine and bromine, said ether being an ether of a saturated aliphatic polyhydroxy alcohol having from about 4 to about 50 carbon atoms.

2. The process of claim 1 wherein said ether is selected from the group consisting of diethylene glycol dimethylether, triethylene glycol dimethylether, and tetraethylene glycol dimethylether.

3. The process of claim 1 wherein the effect of water generated by the reaction is minimized by charging the reactor with a molar excess of alkali metal hydroxide over the moles of haloform employed, the molar ratio of alkali metal hydroxide to haloform thus being greater than 1:1.

4. The process of claim 1 wherein said dihalocarbene acceptor contains at least one aliphatic carbon-to-carbon double bond.

5. The process of claim 1 wherein said alkali metal hydroxide is sodium hydroxide and said haloform is selected from the group consisting of chloroform and bromoform.

6. A process for the preparation of dihalocarbene adducts which comprises effecting a reaction in an initially anhydrous saturated ether reaction medium between finely divided alkali metal hydroxide and a haloform selected from the group consisting of chloroform and bromoform, said ether having a ratio of carbon atoms to oxygen atoms of up to about 3:1 and being selected from the group consisting of (1) $R_1$—O—$R_2$ wherein $R_1$ and $R_2$ are lower alkyl or phenyl, (2) tetrahydrofuran and ring alkylated derivatives thereof, (3) dioxane, (4) dioxolane, (5) tetrahydropyran, (6) dilower alkyl ethers of ethylene glycol, and (7) dilower alkyl ethers of polyethylene glycol, said medium additionally containing a dihalocarbene acceptor, the ether of said reaction medium being further characterized by containing from about 4 to about 50 carbon atoms in the molecule.

7. The process of claim 6 wherein said polyether is selected from the group consisting of diethylene glycol dimethylether, triethylene glycol dimethylether and tetraethylene glycol dimethylether.

8. A process for the preparation of dihalocarbene adducts which comprises effecting a reaction between finely divided sodium hydroxide and chloroform at a temperature in the range of from about 20° C. to about 110° C. in an initially anhydrous polyether reaction medium additionally containing, a dihalocarbene acceptor, the polyether reaction medium being selected from the group consisting of diethylene glycol dimethylether, triethylene glycol dimethylether and tetraethylene glycol dimethylether, the molar ratio of the sodium hydroxide to the chloroform being within the range of from about 1.5:1 to about 5:1.

References Cited by the Examiner

UNITED STATES PATENTS

| | | | |
|---|---|---|---|
| 2,933,544 | 4/1960 | Doering et al. | 260—648 X |
| 2,950,328 | 8/1960 | Orchin | 260—648 |

OTHER REFERENCES

Doering et al.: J. Amer. Chem. Soc., vol. 76, pp. 6162 et seq.

Leitch: Osterreichische Chemiker-Zeitung, vol. 61, No. 6, June 1960, pp. 164–172.

Wagner: Proc Chem. Soc., London (August 1959), p. 229.

LEON ZITVER, *Primary Examiner.*

K. V. ROCKEY, K. H. JOHNSON, *Assistant Examiners.*